(12) United States Patent
Oliva

(10) Patent No.: US 6,246,886 B1
(45) Date of Patent: Jun. 12, 2001

(54) SYSTEM AND METHODS FOR CONTROLLING ACCESS TO DIGITAL WIRELESS NETWORK IN A DUAL MODE WIRELESS SYSTEM

(75) Inventor: Eugene A. Oliva, Lake Hiawatha, NJ (US)

(73) Assignee: Bell Atlantic Mobile, Bedminister, NJ (US)

( * ) Notice: Subject to any disclaimer, the term of this patent is extended or adjusted under 35 U.S.C. 154(b) by 0 days.

(21) Appl. No.: 09/217,247

(22) Filed: Dec. 21, 1998

(51) Int. Cl.[7] .................................................. H04M 7/00

(52) U.S. Cl. ........................ 455/553; 455/68; 455/426; 455/436; 455/453; 455/502; 455/553

(58) Field of Search ..................................... 455/552, 553, 455/453, 450, 454, 426, 436, 443, 502, 509, 422, 69, 68; 370/329, 335, 342

(56) References Cited

U.S. PATENT DOCUMENTS 5,499,395 * 3/1996 Doi et al. .............................. 455/422

* cited by examiner

Primary Examiner—Lee Nguyen
(74) Attorney, Agent, or Firm—McDermott, Will & Emery

(57) ABSTRACT

A dual-mode wireless communication system, having a AMPS-based wireless system and a CDMA-based wireless communication system is configured for transmitting digital wireless telephone signals by selectively transmitting a sync channel into a selected propagation region at a power level that is undetectable by digital telephones located within the selected propagation region. The transmission of the sync channel signal at the undetectable power level causes the dual-mode digital telephone to search for the alternative AMPS-based analog system, limiting access by the dual-mode digital telephones. Hence, the dual-mode wireless communication system can limit access to the digital communication system, for example, to prevent the occurrence of hard handoff with an adjacent analog system, or to reduce usage in a congested sector.

15 Claims, 4 Drawing Sheets

SYSTEM AND METHODS FOR CONTROLLING ACCESS TO DIGITAL WIRELESS NETWORK IN A DUAL MODE WIRELESS SYSTEM

BACKGROUND OF THE INVENTION

1. Field of the Invention

The present invention relates to wireless networks, more specifically to dual-mode wireless telephone communication networks that overlay digital cellular systems over existing analog-based cellular systems.

2. Background Art

Wireless telephone communication systems have evolved from the Advanced Mobile Phone Service (AMPS) technology, introduced around 1983, to more sophisticated digital-based air interface protocols. Specifically, the AMPS technology is an analog-based technology that uses frequency division multiple access techniques to divide the available radio spectrum into channel bandwidths, where each 30 kilohertz voice channel supports a single conversation.

FIG. 1 is a diagram illustrating a cellular communication system including an AMPS-based wireless telephone system 10. As shown in FIG. 1, the AMPS system 10 includes an AMPS compliant base station 12a and a plurality of transceivers 14 configured for transmitting voice channels within the 800 MHz cellular band into overlapping propagation regions 16, also referred to as cells. The arrangement of the antennas 14 at prescribed geographic locations establish a cellular-based coverage area Digital access technologies have been developed based on Time Division Multiple Access (TDMA) or Code Division Multiple Access (CDMA) schemes. These digital access technologies are more efficient relative to analog-based access technologies such as AMPS. In TDMA, the RF carrier is divided into time slots. The digital system allocates speech to these time slots by converting and compressing speech information carried by analog voice signals into compressed digital samples using vocoding techniques, enabling the speech samples to fit into the time slots. Hence, 3 or more time slots may fit into each 30 kHz channel, resulting in at least a three-fold increase in capacity. The well-recognized TDMA-based GSM standard utilizes 8 time slots in 200 kHz bandwidth channels.

Code Division Multiple Access (CDMA) is an even more efficient access technology, where the compressed speech samples are spread over a large frequency band by coding each speech sample with a unique pseudorandom sequence. Multiple voice samples can then be sent through the same wide-frequency band. The digital wireless telephone having the correct pseudorandom sequence will reproduce the corresponding speech sample, whereas voice samples transmitted with different pseudorandom sequences will appear as background noise in the frequency band.

Hence, digital access technologies have substantial advantages over analog-based systems. Digital cellular systems, however, have not yet been deployed in as many regions as AMPS-based systems. Hence, digital cellular subscribers are offered continuous coverage using dual-mode wireless telephones capable of switching between a first mode (e.g., CDMA) and a second mode (e.g., AMPS) based on the availability of a certain technology.

As shown in FIG. 1, a dual-mode wireless communications system 20 includes an analog base station 12b of an analog wireless communications system, a digital cellular system (e.g., CDMA) 22, and a plurality of antennas 24 configured for transmitting both wireless telephone signals from the AMPS base station 12b and the CDMA system 22. Hence, the AMPS base station 12b transmits the analog cellular signals 26 into the appropriate cells 28 via the respective transceiver antennas 24, establishing an analog-based wireless telephone system in the coverage areas 28. Similarly, the CDMA system 22 establishes a digital wireless system by transmitting the CDMA-encoded signals 30 to the same antennas 24 (or separate co-located antennas), enabling the digital wireless system to overlie the prescribed coverage areas 28 of the analog-based system generated by the AMPS base station 12b. Hence, a dual-mode wireless telephone 32 is able to initiate and receive telephone calls within the cell sites 28 using the CDMA system 22, and within the cell sites 16 using the AMPS system 12a AMPS wireless telephones (not shown) can initiate and receive telephone calls in the cell sites 28 using the AMPS system 12b.

A problem encountered in the dual-mode system 20 occurs when the dual-mode wireless telephone moves across a boundary 34 between cellular systems 10 and 20. In particular, assume the dual-mode telephone 32 is in active communication with the CDMA base station 22 for a call in progress while the subscriber moves across the border 34 from the cell sites 28 of the dual-mode system 20 to the cell sites 16 of the AMPS system 10. As recognized in the art, the movement of the dual-mode wireless telephone 32 across the boundary 34 requires a hard handoff by the dual-mode telephone with the AMPS-based system 10. The hard handoff from the CDMA-based system 22 within the dual-mode system 20 to the AMPS-based system 10 is one of the most complicated and signaling-intensive procedures in wireless networks, especially since the dual-mode wireless telephone 32 must switch from digital mode to analog mode simultaneously with the hard handoff. Hence the hard handoff from the CDMA system 22 to the AMPS system 10 has a substantial risk in dropping the call.

Although there is a desirability to minimize the risk in dropped calls, current dual-mode digital telephones 32 are configured for initially searching for the preferred digital technology, such as CDMA. Hence, the dual-mode wireless telephone 32 will connect with the alternative technology (e.g., AMPS) only if the dual-mode digital telephone 32 is unable to establish a link with the preferred digital (e.g., CDMA) technology. Hence, the dual-mode telephone 32 will always try to look for the preferred CDMA technology first. Consequently, the dual-mode telephone 32 cannot be controlled to avoid establishing a CDMA-based call while the digital telephone 32 is within the dual-mode cellular system 20, even if there is a substantial probability that the dual-mode telephone 32 will move across the boundary 34 into the AMPS-based system 10, risking a dropped call.

SUMMARY OF THE INVENTION

There is a need for an arrangement that minimizes the occurrence of dropped calls as a dual-mode telephone moves across a boundary from a dual-mode digital cellular system into an adjacent wireless telephone system having another wireless protocol.

There is also a need for an arrangement that enables a system to selectively overcome priority-based search techniques in dual-mode telephones configured for accessing a digital wireless telephone system prior to attempting access to alternative wireless telephone systems.

There is also a need for an arrangement enabling a dual-mode wireless telephone system having a digital wireless system to limit traffic in a selected propagation region and/or coverage area of the digital wireless system based on a detected traffic condition in the selected region or area.

These and other needs are obtained by the present invention, where a digital wireless communication system configured for transmitting digital wireless telephone signals into propagation regions selectively reduces transmission of a sync channel signal in a selected propagation region to a power level that is undetectable by digital telephones located within at least a selected portion of the selected propagation region. The transmission of the sync channel signal at the reduced power level undetectable by the digital telephone causes the dual-mode digital telephone, located within the selected portion of the selected propagation region, to search for alternative wireless telephone systems (e.g., AMPS-based analog systems), limiting access by the digital telephones. Hence, the digital wireless communication system can selectively limit access by the dual-mode digital telephones without transmitting any control signaling to the dual-mode digital telephones or requiring any modification to the dual-mode telephones.

According to one aspect of the present invention, a method in a digital wireless communications system of transmitting digital wireless telephone signals into propagation regions includes transmitting into a first propagation region a sync channel signal at a first power level. The first power level is sufficient for detection by digital telephones located within the first propagation region. The transmission of the sync channel signal is selectively reduced in a second propagation region to a second power level that is undetectable by digital telephones located within at least a selected portion of the second propagation region.

The above-described reduction in the power level of the sync channel signal in at least a selected portion of the second propagation region enables the digital wireless communication system to limit the access by digital telephones to the digital wireless communication system within the second propagation region. In particular, a dual-mode digital telephone located within the portion of the second propagation region and attempting to access the digital wireless communication system to initiate or receive a wireless telephone call will search for an alternative wireless communication system since the sync channel signal is undetectable. Hence, a dual mode telephone can be effectively controlled to search for an alternate system, for example to reduce the risk that a call will be dropped due to a hard handoff condition from the digital wireless communication system to a second wireless communication system due to the dual-mode telephone crossing a boundary. At the same time, sync channel signals are required by digital telephones only for initial acquisition of the corresponding cell site. Hence, existing wireless telephone calls with the digital wireless communication system are not adversely affected due to the loss of the sync channel signal. Hence, the transmission of the sync channel signal at a second power level that is undetectable by digital telephones located in the portion of the second propagation region provides control over dual-mode telephones, for example by reducing the effect of dropped calls due to hard handoff conditions, without adversely affecting any existing digital wireless telephone calls, or limiting access in detected congestion conditions.

Another aspect of the present invention provides a method of establishing a dual-mode wireless telephone system adjacent to another wireless telephone system having a prescribed wireless protocol. The method includes establishing a first wireless telephone system in prescribed coverage areas using the prescribed wireless protocol. The method also includes establishing a digital wireless system, overlying the prescribed coverage areas of the first wireless system, for communication with the dual-mode wireless telephones according to a prescribed digital wireless protocol. In particular, a sync channel signal is transmitted into a first region of the prescribed coverage areas according to the prescribed digital wireless protocol. The sync channel signal is transmitted into the first region at a first power level sufficient for detection by a first of the dual-mode wireless telephones in the first region. The sync channel signal is also transmitted into a second region of the prescribed coverage areas where the second region has a boundary between the prescribed coverage areas and the other wireless telephone system. The sync channel signal is transmitted into the second region according to the prescribed digital wireless protocol and at a reduced power level that renders the sync channel undetectable by another of the dual-mode wireless telephones located substantially at the boundary.

Hence, dual-mode wireless telephones located substantially at the boundary, having been unable to detect the sync channel, will be forced to establish communication with the first wireless telephone system in accordance with a first wireless protocol that corresponds to the wireless protocol of the other adjacent wireless telephone systems, resulting in a smoother transition between the dual-mode wireless telephone and the other adjacent wireless telephone system. Moreover, the transmission of the sync channel signal at the reduced power level enables the digital wireless system to limit wireless telephone calls according to the prescribed digital wireless protocol to existing telephone calls for dual-mode wireless telephones having previously acquired the sync channel signal. Hence, dual-mode wireless telephones located substantially at the boundary are prevented from initiating new calls on the digital wireless system, while dual-mode wireless telephones having existing calls on the digital wireless system may continue the telephone call unimpeded even as the dual-mode wireless telephones move substantially closer to the boundary.

Still another aspect of the present invention provides a dual-mode wireless telephone communication system. The system includes a first wireless telephone communication system configured for communication with dual-mode wireless telephones in prescribed coverage areas according to a first wireless protocol. The first wireless protocol corresponds to a prescribed wireless protocol of an adjacent wireless telephone system. The system also includes a digital wireless telephone communication system configured for communication with the dual-mode wireless telephones in the prescribed coverage areas according to a prescribed digital wireless protocol. The digital wireless communication system includes first and second base station transceivers for transmitting sync channel signals according to the prescribed digital wireless protocol. The first and second base station transceivers transmit the sync channel signals into first and second propagation regions at first and second power levels, respectively. The second propagation region has a boundary with the adjacent wireless telephone system.

The digital wireless communication system also includes a controller configured for controlling the first and second power levels. The controller sets the first power level to a level that is sufficient for detection by a first of the dual-mode wireless telephones within the first propagation region. The controller also sets the second power level to a level that is undetectable by a second of the dual-mode wireless telephones located substantially at the boundary. Hence, the controller may selectively control the ability of dual-mode wireless telephones to access the digital wireless telephone communication system based on the propagation arrangements covered by the first and second base station transceivers. Hence, the controller can limit the initiation of new telephone calls by dual-mode wireless telephones located substantially at the boundary, without adversely affecting existing telephone calls by other dual-mode wireless telephones that lose the sync channel signal during the middle of the digital wireless telephone call.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, where elements having the same reference numeral designations represent like elements throughout and wherein.

BEST MODE FOR CARRYING OUT THE INVENTION

Figure 1:
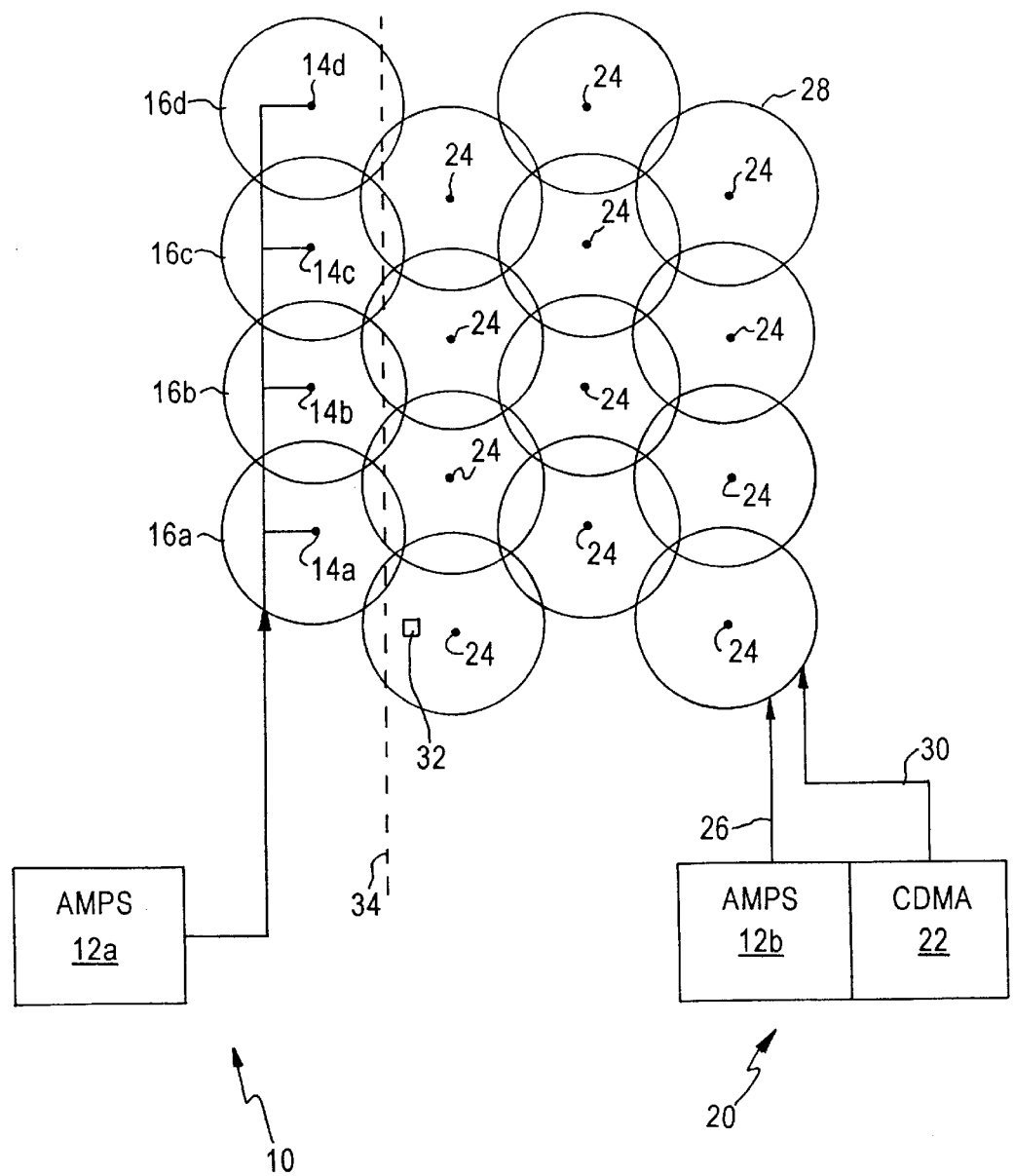
FIG. 1 is a block diagram illustrating a conventional (prior art) system of a dual-mode wireless communication system adjacent to an analog wireless communication system.
Figure 2:
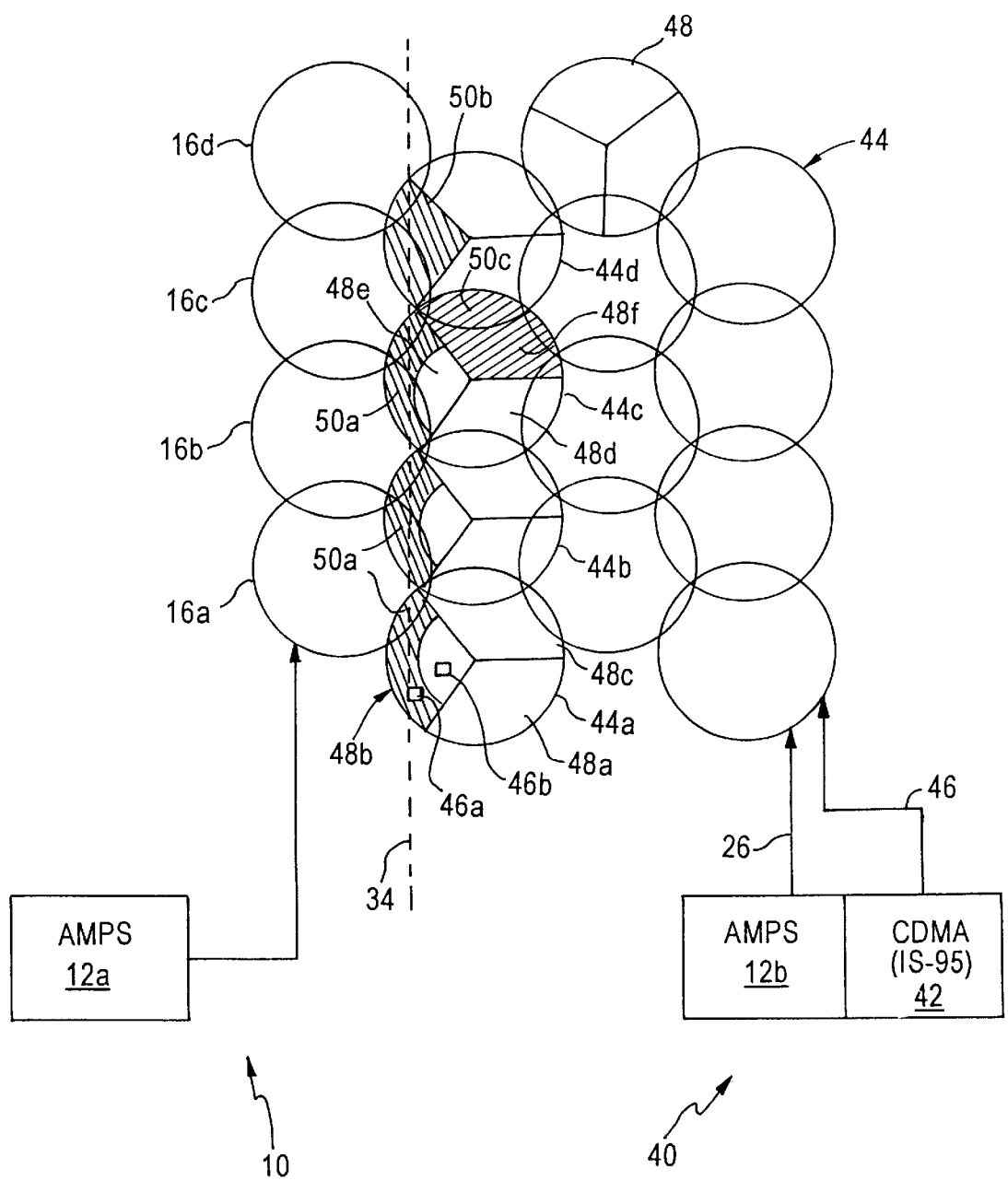
FIG. 2 is a diagram illustrating coverage patterns for a sync channel signal by a dual-mode wireless telephone communication system according to an embodiment of the present invention.

FIG. 2 is a diagram illustrating propagation patterns for transmission of a sync channel signal in a dual-mode wireless telephone communication system according an embodiment of the present invention. As shown in FIG. 2, the dual-mode wireless telephone communication system 40 shares a boundary 34 with another adjacent wireless telephone system 10 having a prescribed wireless protocol, for example AMPS. The boundary 34 is defined as the location at which a hard handoff (i.e., intersystem handoff) occurs between wireless telephones and the dual-mode wireless telephone system 40. As recognized in the art, the boundary 34 will be determined based on the propagation patterns of the cell coverage regions of the respective wireless telephone systems, and may also be affected by atmospheric and geographic conditions that affect the propagation of the wireless telephone signals across the air interface.

As shown in FIG. 2, the dual-mode wireless telephone system 40 includes a first wireless telephone system 12b that outputs analog telephone signals 26 for transmission according to a first wireless protocol that corresponds to the prescribed wireless protocol of the adjacent wireless telephone system 10 (e.g., AMPS). The first wireless telephone system 12b transmits the telephone signals 26 in prescribed coverage areas (e.g., cells) 44 for communication with dual-mode wireless telephones 46 within the coverage areas 44. The AMPS system 12b also enables wireless telephone communications for any analog wireless telephones within the coverage area 44 (not shown).

The dual-mode wireless telephone system 40 also includes a digital wireless system 42 that transmits digital wireless telephone signals 46 for transmission overlying the prescribed coverage areas 44 according to a prescribed digital wireless protocol, for example the CDMA protocol IS-95. As shown in FIG. 2, the analog telephone signals 26 and the CDMA-modulated digital wireless telephone signals 46 can be transmitted in the same prescribed coverage areas without interference. Hence, the analog wireless telephone signals 26 and the digital wireless signals 46 are transmitted into the coverage areas 44 by antennas located at the center of each cell 44. As described below, the digital wireless telephone signals 46 are selectively transmitted on a sector by sector basis. As recognized in the art, a sector 48 is a portion of a given cell 44.

As described above, the dual-mode wireless telephones 46 are generally configured for first identifying the presence of a preferred wireless communication system, for example a CDMA (IS-95) wireless communication system. If the dual-mode telephone 46 is in a region that does not have a preferred technology (e.g., CDMA-based cellular coverage), the dual-mode telephone then searches for the presence of the alternative technology (e.g., the AMPS system 12b) and registers with the alternative technology upon acquisition. Dual-mode telephones provide the advantage of more comprehensive usage for the subscriber, since the dual-mode telephone 46 is usable in areas that do not include the technology preferred by the dual-mode wireless telephone 46. Hence, assuming one of the dual-mode wireless telephones 46 were located well within the coverage area 16 of the AMPS-based system 10, the dual-mode telephone 46 would first attempt to detect the presence of the preferred wireless system (e.g., CDMA); upon determining the preferred technology is not available, the dual-mode telephone 46 would then register with the AMPS system 10 according to the alternative technology circuitry in the dual-mode telephone 46.

A problem arises when the dual-mode telephones 46 are located within the coverage areas 44 of the dual-mode wireless telephone system 40 and attempt to initiate a telephone call using the preferred CDMA system 42 when it may not be entirely favorable to use the CDMA system 42. For example, conditions may arise due to the location of the dual-mode telephone 46a substantially along the boundary 34, or transmission difficulties due to system loading or traffic conditions, where it may be preferable that the dual mode telephone 46a initiates a telephone call on the AMPS system 12b that is less preferred by the dual-mode telephones 46. However, current dual-mode telephones 46 are autonomous in selecting a preferred technology (e.g., the CDMA system 42) over a less preferred system, (e.g., the AMPS system 12b). Hence, there previously has been no way to control selection of the different available wireless telephone system without modification of the dual-mode telephones 46.

According to the present invention, the digital wireless system 42 selectively controls the selection of a wireless telephone system by the dual-mode wireless telephones. In particular, the digital wireless system 42 reduces the transmit power of the sync channel signal at prescribed coverage areas, limiting the availability of the dual-mode wireless telephones 46 to initiate a telephone call on the CDMA telephone system 42.

Hence, the CDMA system 42 controls the transmitted power level of the sync channel signal into selected sectors 48 of the prescribed coverage areas 44 such that certain regions 50, referred to herein as shadow regions 50, propagate the sync channel signal at a level that is substantially undetectable by the dual-mode wireless telephones 46. Stated another way, although the base station may transmit the sync signal the power level is below that needed to reach the boundary of the cell. At certain distances out from the transmitter tower the handset receives a sync signal below a threshold or minimum level necessary for norm sync processing The CDMA system 42 may generate the shadow regions 50 in order to minimize the occurrence of hard handoff at the boundary 34 between the digital wireless telephone system 42 and the adjacent wireless telephone system 40. The CDMA system 42 may generate a shadow region 50a along the boundary 34, where the sync channel signal is generated at a power level corresponding to the attenuation in the air interface between the transmission site and the location of the boundary 34. Alternatively, the CDMA system 42 may transmit the sync channel signal for a selected region at a power level set substantially to zero, resulting in the shadow region 50b corresponding to an entire sector 48. The CDMA system 42 may also reduce the transmit power level of the sync channel signal in a selected sector based on a detected traffic condition in the sector, for example resulting in shadow region 50c for resolving detected traffic conditions within that sector. It should be noted, however, that other channel signals (including pilot, paging, and traffic channels) are transmitted at normal power levels sufficient for detection by all dual-mode telephones 46 in the corresponding sector 48 including any shadow regions 50. As a result, dual-mode telephones 46 having already acquired the sync channel information can still maintain calls on the CDMA system 42 in shadow regions 50.

Hence, the dual-mode wireless telephone 46a within the shadow region 50a is unable to initiate a wireless telephone call with the CDMA system 42 unless the sync channel signal has been previously acquired, for example in sector 48a. Rather, the dual-mode telephone 46a initiates a wireless telephone call with the AMPS system 12b if the dual-mode wireless telephone 40a has not been able to acquire the sync channel signal from a region in the propagation region 44 that is outside the shadow area 50a. As a result, any handoff between cell site 44a and 16a will occur within the same technology circuitry in the dual-mode telephone 46a, enabling a more coordinated handoff between the analog system 12b and the analog system 12a. In addition, the dual-mode telephone 46a may actually register with the adjacent telephone system 10 if the dual-mode telephone 46a is close enough to the boundary 34 and falls within the coverage areas 16, eliminating the necessity for any handoff if the telephone 46a crosses the boundary 34 into system 10.

Figure 3:
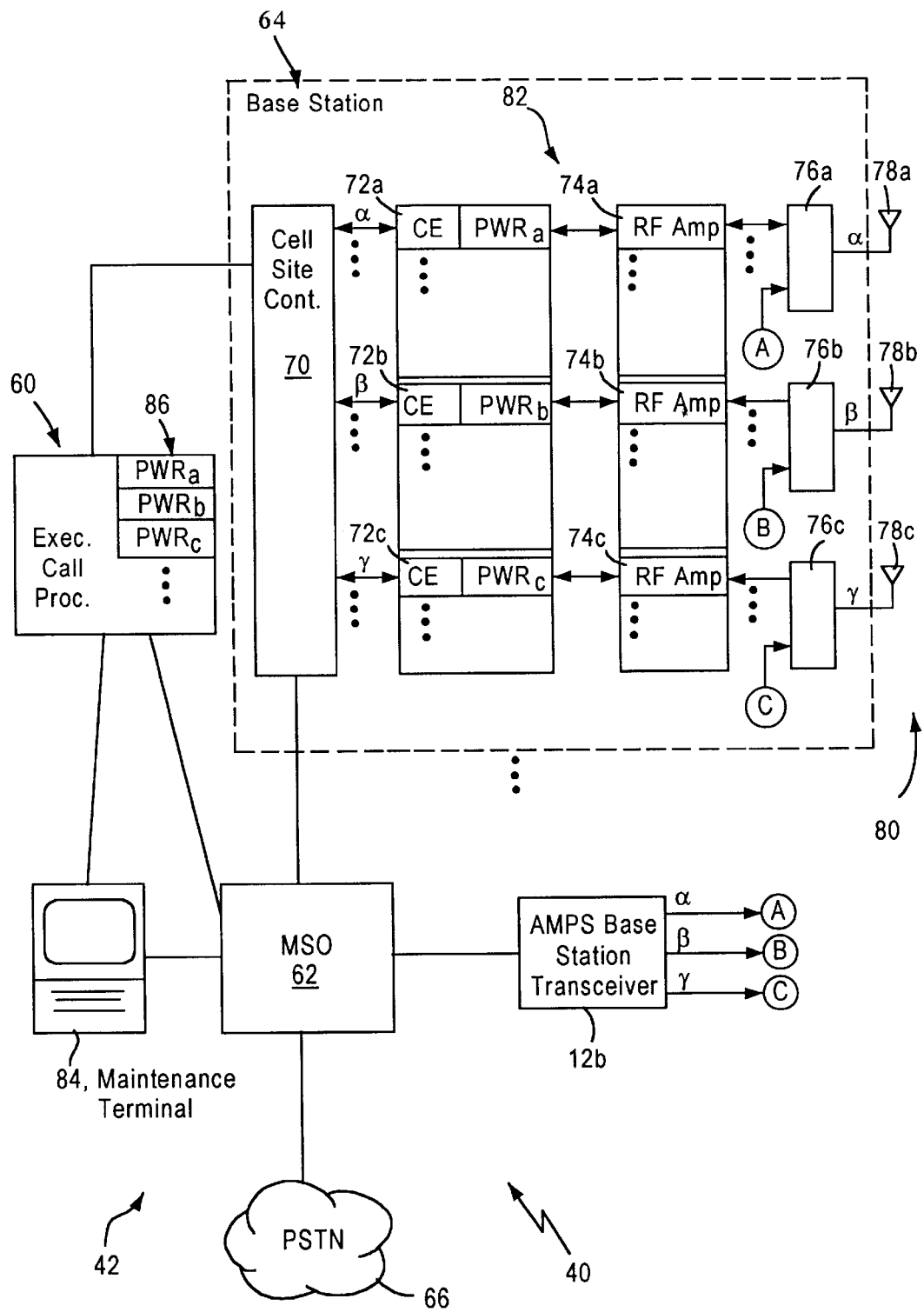
FIG. 3 is a block diagram showing in detail the digital wireless telephone communication system of FIG. 2.

FIG. 3 is a block diagram illustrating the dual-mode wireless telephone system 40 of FIG. 2 to according to an embodiment of the present invention. As shown in FIG. 3, the dual-mode wireless telephone communication system includes a digital wireless telephone communication system 42 that includes a controller 60, also referred to as an executive call processor, a mobile telephone telephone switching office (MTSO) 62, and a plurality of base stations 64 for sending and receiving digital wireless telephone signals to respective cell sites 44 on a per-sector basis. Although only one base station 64 is shown in FIG. 3, it is recognized that each cell site 44 of FIG. 2 has its own associated base station 64 for two-way communication with the digital wireless transceiver circuitry of the dual mode telephones 46 within the corresponding propagation area 44. The MTSO 62 establishes connections between the public switched telephone network 66 and mobile telephones within the dual-mode telephone system 40 using well-known switching techniques. Existing manufacturers of exemplary MTSO switching units 62 includes Lucent, Ericsson, Hughes Network Systems, Motorola, and Northern Telecom. The MTSO 62 provides all central office type functions, such as switching, networking, call processing, call statistics, and billing for the cellular network 40. The MTSO 62 coordinates all the base station activities with the executive call processor 60, such as channel assignments for users in each call. The MTSO 62 also controls soft handoff and hard handoff decisions, routes signaling and voice traffic to and from the public switched telephone network 66, and performs administrative functions such as billing, maintenance, diagnostic testing, and alarm monitoring.

The executive call processor 60 controls transmit power levels by the base stations 64. As described below, the executive call processor 60 is configured for controlling the output power of the transceivers of the base station 64 on a per-channel basis for each sector 48. The executive call processor 60 is configurable by a maintenance terminal 84, enabling a system administrator to manually configure the power level controls, including the channel output power level for selected propagation regions for generation of the shadow regions 50, described in detail below.

The base station 64 includes a cell site controller 70 and base station transceivers 82 that transmit CDMA-modulated data to respective sectors 48. Each base station transceiver 82 includes a plurality of channel elements 72, a plurality of base station transmitter amplifiers 74 associated with the respective channel elements 72, a radio frequency (RF) distributor 76, and a transmit antenna 78 for transmitting the digital wireless telephone signals and the AMPS-based analog telephone signals from the AMPS base station transceiver 12b to the corresponding sector.

The cell site controller 70, also referred to as the CDMA cluster controller, is the processor for the base station 64 for a corresponding cell site 44. The cell site controller 70 receives voice and signaling information from the MTSO 62, and controls the channel elements 72.

The cell site controller 70 supplies the appropriate data (including voice/data traffic and signaling data) and code sequences to the channel elements 72. The channel elements 72 use the code sequences to modulate the supplied information into a spread spectrum signal having a unique code sequence. Hence, the cell site controller 70 supplies to each channel element 72 the appropriate data to be transmitted, for example voice traffic, signaling data, or the like, plus the corresponding code sequences to be used in modulating the associated data for transmission via the air interface.

Each channel element 72 is configured for generating a CDMA modulated signal for an assigned channel on a per sector basis. Each channel element 72 also stores an associated power level (PWR) that specifies the output power level to be used by the corresponding RF amplifier 74 for amplifying the corresponding CDMA modulated signal for transmission into the air interface 80. According to the disclosed embodiment, the channel element 72 controls the corresponding RF amplifier 74 based on a percentage of total power in the base station transmitter amplifier 74. The operation of the base station 64 and the base station transceiver 82 will become more readily apparent upon a review of CDMA technology.

According to the preferred embodiment the cell site transceiver 82 operates according to CDMA protocol IS-95. In particular, CDMA systems have been standardized according to TIA/EIA/IS-95A ("MOBILE STATION-BASE STATION COMPATIBILITY STANDARD FOR DUAL MODE WIDEBAND SPREAD SPECTRUM CELLULAR SYSTEM"—1995), by the Telecommunications Industry Association ("TIA"), the disclosure of which is incorporated in its entirety herein by reference.

With CDMA, each transmitted signal comprises a different pseudorandom binary sequence, also referred to as a pseudonoise (PN) sequence, that modulates a carrier signal, spreading the spectrum of the waveform. Thus, since each CDMA subscriber unit 46 is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in the receivers of the base stations or the subscriber stations by using a correlator (i.e., channel element 72), which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system. CDMA interference therefore can be controlled, with the goal of increasing system capacity, on the basis of the reduction in signal-to-noise ratio caused by other users within the cellular CDMA system. Thus, a goal in any CDMA system is to limit the power output of transmitters in order to minimize the cumulative system noise caused by the other users in the CDMA system.

As recognized in the art the wireless CDMA system 42 may be implemented as a cellular-tape system, or a PCS-type system for Personal Communication Services (PCS). A proposed standard for a CDMA PCS system has been submitted by the Joint Technical Committee of the TIA, entitled PN-3384, "PERSONAL STATION-BASE STATION COMPATIBILITY REQUIREMENTS FOR 1.8 TO 2.0 GHz CODE DIVISION MULTIPLE ACCESS (CDMA) PERSONAL COMMUNICATIONS SYSTEMS"., Nov. 3, 1994, the disclosure of which is incorporated herein by reference. The PCS proposed standard PN-3384 specifies enhanced services including transmission rates up to 14.4 kbps for enhanced speech quality, full data services at rates up to about 13 kbps, and simultaneous transmission of voice and data The CDMA PCS system is adapted to operate in any of the licensed PCS frequency allocations from the FCC, currently assigned at 1930–1990 MHz band for the forward CDMA channel (base station to subscriber), and 1850–1910 MHz for the reverse CDMA channel (subscriber to base station).

The forward CDMA channel signals for each sector 48 include sixty four (64) code channels generated by the channel elements 72. Each channel element 72 may handle one or more code channels. Certain code channels are assigned to different logic channels. For example, code channel 0 is used as a pilot channel, code channels 1–7 are used for either paging channels or traffic channels, and code channel 32 is used as a sync channel or a traffic channel. The remaining code channels are traffic channels. The paging channel, which supports a fixed data rate at 9600, 4800, or 2400 bps, is used for transmission of either control information or pages from the base station to the mobile station. Each paging channel slot has a 200 millisecond interval.

The CDMA circuitry in the dual-mode telephone 46, upon initializing for operation in a CDMA system, acquires the pilot channel of the cell site (e.g., 44a), and attempts to obtain system configuration and timing information for the CDMA cell site 44a from the sync channel. In particular, the sync channel is used by the CDMA circuitry in the dual-mode telephone handsets 46 to acquire initial time synchronization data, transmitted as a complex direct sequence spread spectrum signal consisting of encoded data modulated with the short PN sequence and Walsh function 32. A sync channel is required on the primary and secondary CDMA RF channels to provide the digital CDMA circuitry in the dual-mode wireless telephone 46 with the basic timing information when the mobile 46 first acquires the base stations. The CDMA circuitry will periodically search for the sync channel, for example every 5–10 minutes. Note that sync channels are not required on the remaining CDMA RF channels.

The sync channel message contains the following information: system identification (the identifier number for the cellular system 42), network identification (a sub-identifier for the cellular system 40), the pilot PN sequence offset index specifying the offset index for the corresponding sector 48 (in units of 64 chips), the long code state (i.e., the state of the long code generator at the start of the next frame, given by the system time parameter). The sync channel message also includes a leap second parameter (the number of leap seconds that have occurred since the start of the system as of Jan. 6, 1980, 0:00:00 UTC), the offset from local time, daylight savings time indicator, and page channel data rate (indicating the current data rate on the page channels, either 4.8 kilobits per second or 9.6 kilobits per second).

Figure 4:
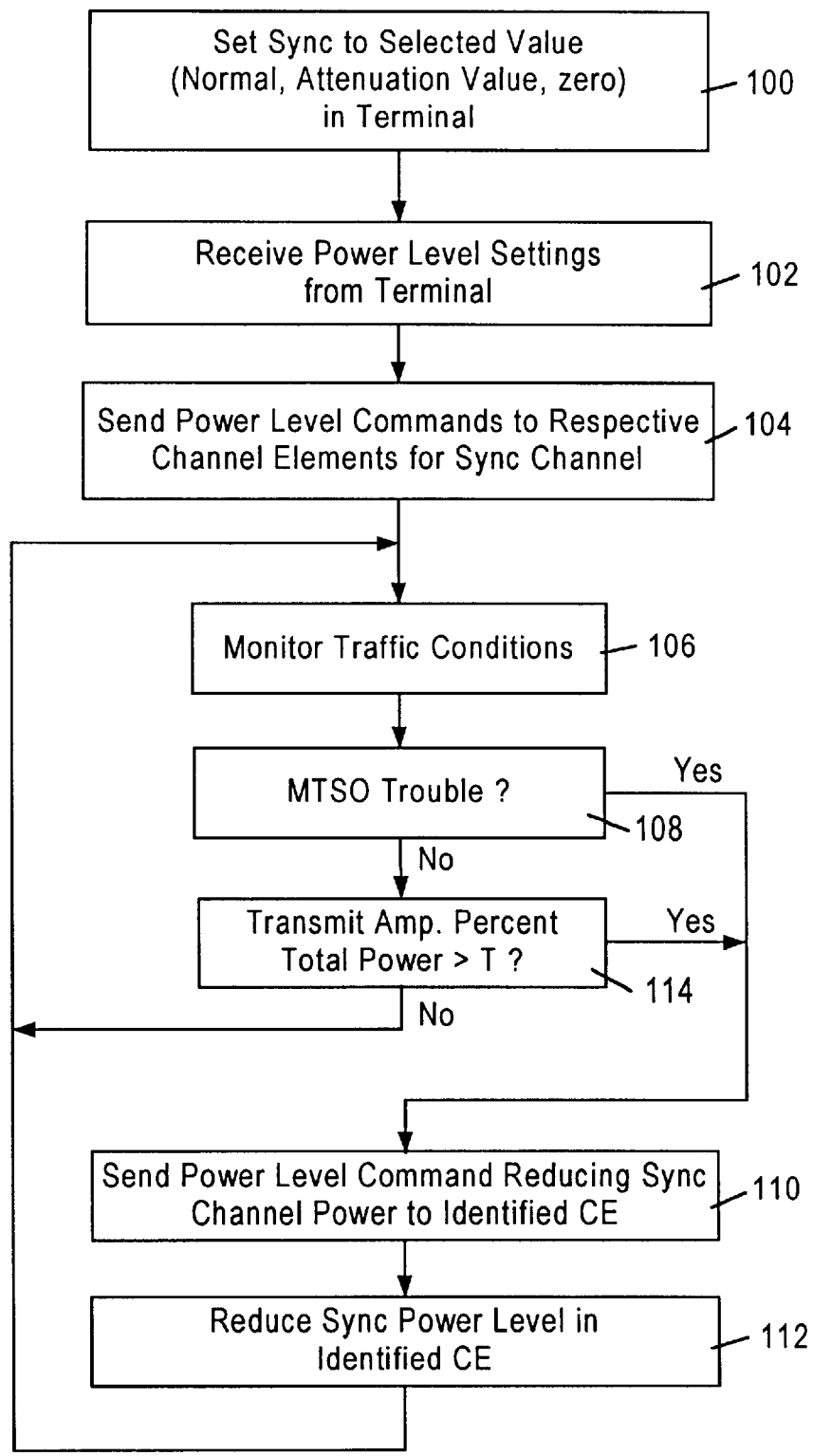
FIG. 4 is a flow diagram illustrating the method for transmitting the sync channel signal at selected power levels in the digital wireless communication system according to an embodiment of the present invention.

FIG. 4 is a flow diagram illustrating the method for the transmission of sync channel signals for the selected formation of shadow regions 50 according to an embodiment of the present invention. A network administrator manually sets the power levels (PWR) in registers 86 within the executive call processor 60 for each of the channel elements 72 in step 100. Normally the network administrator manually sets the power levels in the executive call processor 60 using the maintenance terminal 84 when the digital wireless system 42 is first established. According to the present invention, however, the maintenance terminal 84 is used to program the executive call processor 60 with the optimum power level settings for formation of the shadow regions 50 along the boundary 34 of FIG. 2.

The executive call processor 60 receives the power level settings (PWR) from the maintenance terminal 84 in step 102 for each channel element 72, and sends power level commands to the respective channel elements 72 in step 104. For example, assume that channel elements 72a, 72b, and 72c control the sync channel transmission in sectors 48d, 48e, and 48f of FIG. 2 respectively. The executive call processor 60 sends a channel power level of 100% ($PWR_a$=100%) to channel element 72a, a second power level ($PWR_b$=50%) to channel element 72b, and a third channel power level ($PWR_c$=95%) to channel element 72c. The channel elements 72a, 72b, and 72c load the supplied channel power levels into respective registers 88, and output the modulated sync channel signal according to the supplied channel power levels. Hence, the channel element 72a controls amplifier 74a to output the sync channel signal at fill power, resulting in complete coverage in sector 78d. Channel element 72b, however, controls amplifier 74b to generate the sync channel signal at a reduced power level of 50%, where the reduced power level corresponds to the attenuation in the air interface between the cell site antenna 78b and the boundary 34.

Once the executive call processor 60 completes initialization of the channel elements 72, the executive call processor 60 monitors the traffic conditions in step 106 to determine whether the digital cellular system 42 is overloaded. For example, the executive call processor 60 regularly fetches the percent total power from registers 88 from the traffic channel elements that may be variable depending on the number of subscribers having calls in progress on traffic channels in a given sector. Alternatively, the executive call processor 60 may query the MTSO 62 to determine if there exists any fault or any troubles in the switching of calls by the MSTO 62.

If the executive call processor 60 determines in step 108 that MTSO 62 reports trouble in step 108, the executive call processor 60 outputs a power level command in step 110 for reducing the sync power channel in the effected sector in step 110. For example, assume that the MSTO 62 determines a trouble in sector 48*f*. In this case, the executive call processor 60 outputs a command specifying a new power level (PWR$_c$=0) to the channel element 72*c*. The identified channel element 72*c* then responds to the command and reduces the sync power level in step 112, resulting in formation of the shadow region 50*c* to halt the registration of any new dual-mode telephones 46 within sector 48*f*.

Similarly, the executive call processor 60 checks in step 114 if any of the traffic channel elements 72 have a percentage of total power that exceeds a prescribed threshold (T) indicating an unusually heavy amount of traffic within the sector (e.g., sector 48*f*). If the executive call processor 60 determines in step 114 that the percentage of total power in the base station transmitter amplifier 74 exceeds the prescribed threshold (T), the executive call processor also sends the power level command (e.g., PWR$_c$=0) to reduce the channel power in step 110.

The reduction in sync channel power reduces the effective radius of the coverage area of the sync channel, distinct from the pilot, paging, and traffic channels. As a result, reducing the sync channel power to a partial value (e.g., PWR$_c$=25%) reduces the radius of the coverage area for the sync channel to a pattern that resembles the coverage area 48*e* of FIG. 2. As a result, a partial reduction in the sync channel power limits the number of dual mode telephones that can register with the sector 48 to those within the reduced coverage area, for example telephone 46*b*. Reducing the power to zero (e.g., PWR$_c$=0) prevents any new telephones 46 from registering with the corresponding sector 48, although telephones 46 having previously acquired the sync channel information prior to the reduction in power can still initiate and maintain calls in progress. However since the digital telephones periodically (e.g., 5–10 minutes) scan for the sync channel, even those dual mode telephones having previously acquired the sync channel information will detect the loss of the sync channel and eventually transfer to the alternative system 12*b*.

Hence, the reduction in transmission power level of the sync channel signal reduces the number of dual mode wireless telephones that can register with the sector, such that the greater the reduction in transmission power level, the greater the reduction in the number of dual mode digital telephones that can register with the sector assuming a uniform distribution within the corresponding sector.

According to the present invention, access to the digital cellular system 42 is controlled by selectively adjusting the output power of the sync channel, enabling dual-mode wireless telephones to access the alternative wireless system 12*b*. This arrangement is particularly effective in reducing the number of dropped calls during hard handoff for dual-mode telephones located substantially at the boundary between two wireless telephone systems, as well as reducing the network loading in sectors identified as having a high amount of traffic.

Although the disclosed embodiment is described in terms of a primary wireless network as being IS-95 compliant CDMA and the alternative network being an AMPS-based analog system, it will be appreciated that other wireless technologies may be used in both instances, for example, North American TDMA (IS-41), or the European GSM protocol.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A method of establishing a dual mode wireless telephone system adjacent to another wireless telephone system having a prescribed wireless protocol, the method comprising:

establishing a first wireless telephone system in prescribed coverage areas using the prescribed wireless protocol for communication with dual mode wireless telephones in the prescribed coverage areas according to the prescribed wireless protocol; and establishing a digital wireless system, overlying the prescribed coverage areas of the first wireless system, for communication with the dual mode wireless telephones according to a prescribed digital wireless protocol, including:

(1) transmitting a sync channel signal into a first region of the prescribed coverage areas according to the prescribed digital wireless protocol and at a first power level sufficient for detection by a first of the dual mode wireless telephones in the first region, and (2) transmitting the sync channel signal into a second region of the prescribed coverage areas, having a boundary between the prescribed coverage areas and the another wireless telephone system, according to the prescribed digital wireless protocol and at a reduced power level that renders the sync channel signal undetectable by a second of the dual mode wireless telephones located substantially at the boundary.

2. The method of claim 1, wherein the step of transmitting the sync channel signal in the first region comprises:

sending a first command from an executive call processor, configured for controlling transmission of the sync channel signal into the prescribed coverage areas, specifying the first power level to a first channel element configured for controlling transmission of the sync channel signal into the first region; and controlling by the first channel element a first base station transceiver for transmission of the sync channel signal into the first region at the first power level.

3. The method of claim 2, wherein the step of transmitting the sync channel signal into the second region comprises:

sending a second command from the executive call processor specifying the second power level to a second channel element configured for controlling transmission of the sync channel signal into the second region; and controlling by the second channel element a second base station transceiver for transmission of the sync channel signal into the second region at the second power level.

4. The method of claim 3, further comprising setting the second power level in the executive call processor via a maintenance terminal in communication with the executive call processor.

5. The method of claim 3, wherein the step of transmitting the sync channel signal into the second region further includes transmitting the sync channel signal into a prescribed sector of a cell in a cellular system, the prescribed sector corresponding to the second region.

6. The method of claim 1, wherein the step of transmitting the sync channel signal into the first region includes reducing the transmitted power level from the first power level based on a detected traffic condition in the first region.

7. The method of claim 6, further comprising detecting the traffic condition as a percentage of total power in a base station transmitter amplifier, configured for amplifying wireless telephone signals for transmission into the first region, exceeding a prescribed threshold.

8. A dual mode wireless telephone communications system, comprising:
 a first wireless telephone communications system configured for communication with dual mode wireless telephones in prescribed coverage areas according to a prescribed wireless protocol of an adjacent wireless telephone system; and
 a digital wireless telephone communications system configured for communication with the dual mode wireless telephones in the prescribed coverage areas according to a prescribed digital wireless protocol, the digital wireless communications system comprising:
  (1) first and second base station transceivers for transmitting sync channel signals according to the prescribed digital wireless protocol into first and second propagation regions at first and second power levels, respectively, the second propagation region having a boundary with the adjacent wireless telephone system, and
  (2) a controller configured for controlling the first and second power levels, the controller setting the first power level sufficient for detection by a first of the dual mode wireless telephones within the first propagation region the controller setting the second power level to a level undetectable by a second of the dual mode wireless telephones located substantially at the boundary.

9. The system of claim 8, wherein the digital wireless telephone communications system further comprises first and second channel elements configured for controlling the transmission of the sync channel signals by the first and second base station transceivers in response to first and second control commands from the controller specifying the first and second power levels, respectively.

10. The system of claim 9, wherein the first and second base station transceivers each comprises a base station transmitter amplifier configured for amplifying the sync channel signal according to the corresponding power level, the controller monitoring a percentage of total power in each of the base station transmitter amplifier as a traffic load of the corresponding propagation region.

11. The system of claim 10, wherein the controller outputs a third control command specifying a third power level, undetectable by the first of the dual mode wireless telephones within at least a portion of the first propagation region, in response to the percentage of total power corresponding to the first propagation region exceeding a prescribed threshold, the first base station transceiver in response reducing the sync channel signal transmitted into the first propagation region.

12. The system of claim 10, further comprising a maintenance terminal configured for setting the first and second power levels in the controller.

13. The system of claim 8, wherein the prescribed digital wireless protocol is IS-95.

14. A dual mode wireless telephone communications system, comprising:
 a first wireless telephone communications system configured for communication with dual mode wireless telephones in prescribed coverage areas according to a prescribed wireless protocol of an adjacent wireless telephone system; and
 a digital wireless telephone communications system configured for communication with the dual mode wireless telephones in the prescribed coverage areas according to a prescribed digital wireless protocol, the digital wireless communications system comprising:
  (1) first and second base station transceivers for transmitting sync channel signals according to the prescribed digital wireless protocol into first and second propagation regions at first and second power levels, respectively, the second propagation region having a boundary with the adjacent wireless telephone system, and
  (2) a controller configured for controlling the first and second power levels, the controller setting the first power level sufficient for detection by a first of the dual mode wireless telephones within the first propagation region, the controller setting the second power level to a level undetectable by a second of the dual mode wireless telephones located in at least a portion of the second propagation region based on a detected condition in the second propagation region.

15. The system of claim 14, wherein the controller sets the second power level based on a detected power level for a traffic channel transmitted by the second base station transceiver exceeding a prescribed threshold.

* * * * *